United States Patent
Chen et al.

(10) Patent No.: US 10,819,441 B2
(45) Date of Patent: Oct. 27, 2020

(54) ADAPTIVE DIGITAL FILTERING IN AN OPTICAL RECEIVER

(71) Applicant: Nokia Solutions and Networks OY, Espoo (FI)

(72) Inventors: Xi Chen, Aberdeen, NJ (US); Peter J. Winzer, Aberdeen, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/039,560

(22) Filed: Jul. 19, 2018

(65) Prior Publication Data
US 2020/0028592 A1 Jan. 23, 2020

(51) Int. Cl.
H04B 10/60 (2013.01)
H04B 10/40 (2013.01)
H04B 10/50 (2013.01)
H04B 10/63 (2013.01)
H04B 10/61 (2013.01)
H04B 10/64 (2013.01)

(52) U.S. Cl.
CPC ............ *H04B 10/60* (2013.01); *H04B 10/40* (2013.01); *H04B 10/50* (2013.01); *H04B 10/61* (2013.01); *H04B 10/612* (2013.01); *H04B 10/614* (2013.01); *H04B 10/6165* (2013.01); *H04B 10/63* (2013.01); *H04B 10/64* (2013.01)

(58) Field of Classification Search
None
See application file for complete search history.

(56) References Cited

U.S. PATENT DOCUMENTS 6,485,872 B1 * 11/2002 Rosenthal .......... G01B 11/0625
250/472.1
7,123,402 B1 10/2006 Doerr et al.
(Continued)

OTHER PUBLICATIONS

Antonelli, "Polarization multiplexing with the Kramers Kronig receiver", Dec. 15, 2017, Journal of Lightwave Technology; vol. 35, No. 24, pp. 5418-5424. (Year: 2017).*
(Continued)

*Primary Examiner* — Darren E Wolf
(74) *Attorney, Agent, or Firm* — Mendelsohn Dunleavy, P.C.; Yuri Gruzdkov (57) ABSTRACT

A self-coherent optical data receiver configured to use direct detection of optical signals that is compatible with full (amplitude/phase) electric-field reconstruction. To enable the latter, the direct-detected optical signal includes CW light whose carrier frequency is spectrally aligned with a roll-off edge of the data-modulated portion of the signal. In an example embodiment, the receiver may employ two digital filters placed upstream and downstream, respectively, of the field-reconstruction circuit. The upstream filter is configurable to at least partially cancel the effects of SSBI caused by the direct detection. The downstream filter can be configured to perform electronic dispersion compensation and/or electronic polarization demultiplexing. In different embodiments, a filter controller may operate to adaptively change the filter coefficients of the upstream filter based on different signals generated within the digital receive chain. For example, the filter controller can use either input or output of the downstream filter for this purpose.

23 Claims, 6 Drawing Sheets

(56) References Cited

U.S. PATENT DOCUMENTS

| | | | |
|---|---|---|---|
| 7,526,211 | B2 | 4/2009 | Mcnicol et al. |
| 8,693,886 | B2 | 4/2014 | Kikuchi |
| 8,842,997 | B2 | 9/2014 | Liu et al. |
| 9,209,908 | B2 | 12/2015 | Yu et al. |
| 2003/0072060 | A1 | 4/2003 | Sourani |
| 2003/0189745 | A1 | 10/2003 | Kikuchi et al. |
| 2008/0234489 | A1* | 9/2008 | Brasch .......... C07F 15/065 548/108 |
| 2009/0074428 | A1* | 3/2009 | Liu .............. H04B 10/2513 398/208 |
| 2010/0110426 | A1* | 5/2010 | Cicerone .......... G01J 3/02 356/301 |
| 2011/0097075 | A1* | 4/2011 | Tanimura ...... H04B 10/07953 398/1 |
| 2013/0259490 | A1* | 10/2013 | Malouin ......... H04B 10/6166 398/152 |
| 2015/0071656 | A1 | 3/2015 | Oyama et al. |
| 2015/0257986 | A1* | 9/2015 | Sun .............. A61K 6/0835 523/115 |
| 2016/0112123 | A1 | 4/2016 | Chen et al. |
| 2016/0127049 | A1 | 5/2016 | Randel et al. |

OTHER PUBLICATIONS

"Fiber Optical Transmission Systems," www.springer.com, 2012 [retrieved on Apr. 13, 2017] Retrieved from the Internet: <URL: http://www.springer.com/cda/content/document/cda_downloaddocument/9783642210549-c2.pdf?SGWID=0-0-45-1246859-p174123873 (20 pages).

Che, Di, et al., "Stokes Vector Direct Detection for Linear Complex Optical Channels," 2015, Journal of Lightwave Technology, vol. 33, No. 3, pp. 678-684.

Chen, X., et al. "High-speed Fading-free Direct Detection for Double-Sideband OFDM Signal via Block-wise Phase Switching," Optical Fiber Communication Conference and Exposition and the National Fiber Optic Engineers Conference (OFC/NFOEC), 2013 (3 pages).

Matsui, Yasuhiro, et al., "55-GHz Bandwidth Short-Cavity Distributed Reflector Laser and its Application to 112-Gb/s PAM-4," OFC Postdeadline Papers OSA, 2016 (3 pages).

Morsy-Osman, Mohamed, et al., "Four-Dimensional Modulation and Stokes Direct Detection of Polarization Division Multiplexed Intensities, Inter Polarization Phase and Inter Polarization Differential Phase," Journal of Lightwave Technology, vol. 34, No. 7, 2016, pp. 1585-1592.

Mecozzi, Antonio, et al., "Kramers-Kronig Coherent Receiver," Optica, vol. 3, No. 11, 2016, pp. 1220-1227.

Yamazaki, Hiroshi, et al., "300-Gbps Discrete Multi-tone Transmission Using Digital-Preprocessed Analog-Multiplexed DAC with Halved Clock Frequency and Suppressed Image," ECOC—Post Deadline 42nd European Conference and Exhibition on Optical Communications, 2016, pp. 25-27.

Taylor, Leonard S., "The Phase Retrieval Problem," IEEE Transactions on Antennas and Propagation, vol. AP-29, No. 2, 1981, pp. 386-391.

Mecozzi, Antonio, "A necessary and sufficient condition for minimum phase and implications for phase retrieval," IEEE Transactions on Information Theory, vol. 13, No. 9, 2014, pp. 1-9.

Savory, Seb J., "Digital filters for coherent optical receivers," Optics Express, vol. 16, Issue 2, 2008, pp. 804-817.

Chen, X., "Frequency-Resolved Measurements of Signal, Noise, and Signal-Signal Beat Interference in Self-Coherent Direct-Detection Receivers." Optical Fiber Communication Conference. Optical Society of America, 2018, 3 pages.

Chen, X., et al. "Kramers-Kronig receivers for 100-km datacenter interconnects." Journal of Lightwave Technology 36.1 (2018): 79-89.

Peng, W., "Experimental demonstration of a coherently modulated and directly detected optical OFDM system using an RF-tone insertion." in Optical Fiber communication/National Fiber Optic Engineers Conference, IEEE 2008, pp. 1-3.

Peng, W., et al. "Spectrally efficient direct-detected OFDM transmission employing an iterative estimation and cancellation technique." Optics express 17.11 (2009): 9099-9111.

Helder, R., et al. "Mono-objective optimization for direct detection optical OFDM transmissions in short-range links." Journal of Microwaves, Optoelectronics and Electromagnetic Applications (JMOe) 12 (2013): 113-127.

Chen, X., et al. "Optical Transport System Employing Direct-Detection Self-Coherent Receivers and Compatible Transmitters." U.S. Appl. No. 15/581,578, filed Apr. 28, 2017 at the USPTO.

Peng, WR et al., "Enabling high capacity direct-detection optical OFDM transmissions using beat interference cancellation receiver." 36th European Conference and Exhibition on Optical Communication Sep. 19, 2010; (pp. 1-3). IEEE.

Shi, H. et al., "SSBI cancellation based on time diversity reception in SSB-DD-OOFDM transmission systems." CLEO: Applic.ations and Technology Jun. 8, 2014; Optical Society of America. (pp. JTh2A-14).

Zhu M, et al., "Hilbert superposition and modified signal-to-signal beating interference cancellation for single side-band optical NPAM-4 direct-detection system." Optics express. May 29, 2017; vol. 25 Issue 11 (pp. 12622-12631).

Li Z. et al., "Signal-signal beat interference cancellation in spectrally-efficient Wdm direct-detection Nyquist-pulse-shaped 16-QAM subcarrier modulation." Optics express. Sep. 7, 2015; vol. 23 Issue 18 (pp. 23694-23709).

Li, Z. et al. "SSBI mitigation and the Kramers-Kronig scheme in single-sideband direct-detection transmission with receiver-based electronic dispersion compensation." Journal of Lightwave Technology May 15, 2017; vol. 35 Issue 10 (pp. 1887-1893).

Liu X. et al., "Digital self-coherent detection." Optics Express. Jan. 21, 2008; vol. 16 Issue 2 (pp. 792-803.).

Che, Di, et al., "Linearization of direct detection optical channels using self-coherent subsystems." Journal of Lightwave Technology 342 (2016): pp. 516-524.

Mecozzi A. "A necessary and sufficient condition for minimum phase and implications for phase retrieval". IEEE Trans. on Information Theory 13.9 (2014).

Mecozzi A. et al., "The Kramers-Kronig receiver." Optical Fiber Communication Conference 2018 OSA,—The Optical Society. (2018) pp. Tu2D-1.

Chen, Xi, et al. "218-Gb/s single-wavelength, single-polarization, single-photodiode transmission over 125-km of standard singlemode fiber using Kramers-Kronig detection." Optical Fiber Communication Conference. Optical Society of America, Mar. 2017, 3 pages.

Le, S. T., et al. "8× 256Gbps virtual-carrier assisted WDM direct-detection transmission over a single span of 200km." 2017 European Conference on Optical Communication (ECOC). IEEE, 2017, pp. 1-3.

Bo, Tianwai, et al. "Kramers-Kronig receiver without digital upsampling." 2018 Optical Fiber Communications Conference and Exposition (OFC). Optical Society of America, Mar. 2018, 4 pages.

Füllner, Christoph, et al. "Transmission of 80-GBd 16-QAM over 300 km and Kramers-Kronig reception using a low-FIR Hilbert filter approximation." 2018 Optical Fiber Communications Conference and Exposition (OFC). Optical Society of America, Mar. 2018, 3 pages.

Li, Zhe, et al. "Comparison of digital signal-signal beat interference compensation techniques in direct-detection subcarrier modulation systems." Optics Express 24.25 (2016): 29176-29189.

Erkılınç, M. Sezer, et al. "Performance Comparison of Single-Sideband Direct Detection Nyquist-Subcarrier Modulation and OFDM." Journal of Lightwave Technology 33.10 (2015): 2038-2046.

Hameed, Mahmood Abdul. "Nonlinear Mixing in Optical Multicarrier Systems." Dissertation, University of Kansas (2016): 75 pages.

Li, Zhe, et al. "Simplified DSP-based Signal—Signal Beat Interference Mitigation Technique for Direct Detection OFDM." Journal of Lightwave Technology 34.3 (2015): 866-872.

(56) References Cited

OTHER PUBLICATIONS

Pereira, Càtia R. C. "Cancellation of signal-signal beat interference in multi-band orthogonal frequency division multiplexing metropolitan networks employing an electroabsorption modulator", Dissertation, University of Lisbon (2016): 10 pages.

\* cited by examiner

FIG. 3

$(358) = (302), (332), \text{ OR } (342)$

ADAPTIVE DIGITAL FILTERING IN AN OPTICAL RECEIVER

BACKGROUND

Field

Various example embodiments relate to optical communication equipment and, more specifically but not exclusively, to optical receivers.

Description of the Related Art

This section introduces aspects that may help facilitate a better understanding of the disclosure. Accordingly, the statements of this section are to be read in this light and are not to be understood as admissions about what is in the prior art or what is not in the prior art.

Some optical receivers are capable of detecting not only the amplitude of an optical signal, but also the signal's phase. As a result, the optical field can substantially be reconstructed at the receiver and then be used for signal-equalization purposes, e.g., directed at reducing the adverse effects of transport-link impairments, such as chromatic dispersion, polarization-mode dispersion, etc.

SUMMARY OF SOME SPECIFIC EMBODIMENTS

In at least some optical transport systems, the end-to-end transmission of data may impose certain signal distortions at the transmitter and/or the receiver in addition to the above-outlined transport-link signal distortions. Some of the additional signal distortions may be implementation- and/or system-specific.

Disclosed herein are various embodiments of a self-coherent optical data receiver configured to use direct (square-law) detection of optical signals that is compatible with full (e.g., amplitude and phase) electric-field reconstruction. To enable the latter, the direct-detected optical signal includes continuous-wave (CW) light whose carrier frequency is spectrally aligned with a roll-off edge of the data-modulated portion of the signal. In an example embodiment, the receiver may employ two digital filters placed upstream and downstream, respectively, of the field-reconstruction circuit. The upstream filter is configurable to at least partially cancel the effects of signal-to-signal beat interference (SSBI) caused by the direct detection in the analog front end of the receiver. The downstream filter can be configured to perform electronic dispersion compensation and/or electronic polarization demultiplexing.

In different embodiments, a filter controller may operate to adaptively change the filter coefficients of the upstream filter based on different signals generated within the digital receive chain. For example, in some embodiments, the filter controller can be configured to use for this purpose either a digital output signal generated by the downstream filter or a digital input signal applied to the downstream filter.

The use of an upstream filter in addition to the downstream filter can be beneficial, e.g., because such use is capable of significantly reducing the residual signal distortions (including the effects of SSBI) and the associated optical signal-to-noise-ratio penalty compared to those achievable with at least some signal-processing techniques conventionally used in self-coherent optical data receivers.

According to one embodiment, provided is an apparatus comprising an analog front end and a digital signal processor; wherein the analog front end comprises a photodetector configured to convert an optical input signal into an electrical signal proportional to an optical power of the optical input signal; wherein the digital signal processor comprises a first digital filter and a field-reconstruction circuit, the first digital filter being configured to generate a first filtered digital signal in response to the electrical signal, the field-reconstruction circuit being configured to estimate an amplitude and a phase of the optical input signal in response to the first filtered digital signal; and wherein the first digital filter is configurable to digitally filter a digital representation of the electrical signal to remove therefrom at least some signal distortions imposed by the analog front end.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

Some embodiments may benefit from the use of at least some features disclosed in U.S. patent application Ser. No. 15/581,578, filed on 28 Apr. 2017, and entitled "OPTICAL TRANSPORT SYSTEM EMPLOYING DIRECT-DETECTION SELF-COHERENT RECEIVERS AND COMPATIBLE TRANSMITTERS," which is incorporated herein by reference in its entirety.

Some embodiments may benefit from the use of at least some features of a direct-detection scheme disclosed in A. Mecozzi, et al., "Kramers-Kronig Coherent Receiver," Optica 3, pp. 1218-1227 (2016), which is incorporated herein by reference in its entirety.

Figure 1:
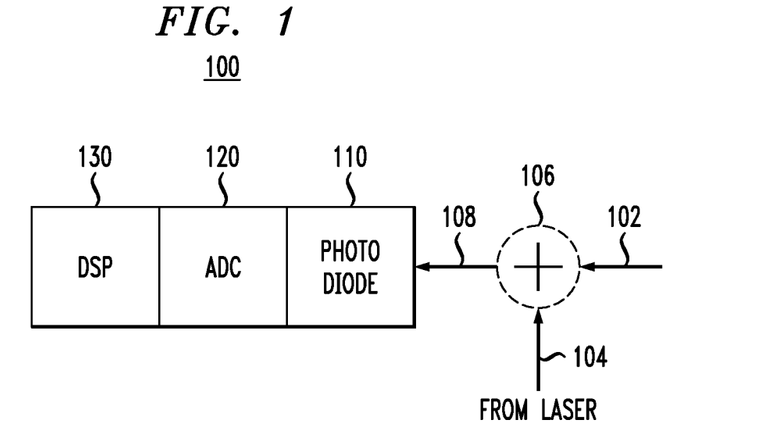
FIG. 1 shows a block diagram of an optical receiver according to an embodiment.

FIG. 1 shows a block diagram of an optical receiver 100 according to an embodiment. Receiver 100 comprises a photodiode 110, an analog-to-digital converter (ADC) 120, and a digital signal processor (DSP) 130. In some embodiments, receiver 100 may also include an optical signal combiner (e.g., optical coupler) 106.

Receiver 100 is a direct-detection receiver because photodiode 110 is configured to convert an optical input signal 108 into a corresponding electrical signal that is proportional to the optical power (electric field squared) thereof, and apply that electrical signal to ADC 120. In some embodiments, photodiode 110 can be the only photodiode used in receiver 100.

Figure 2:
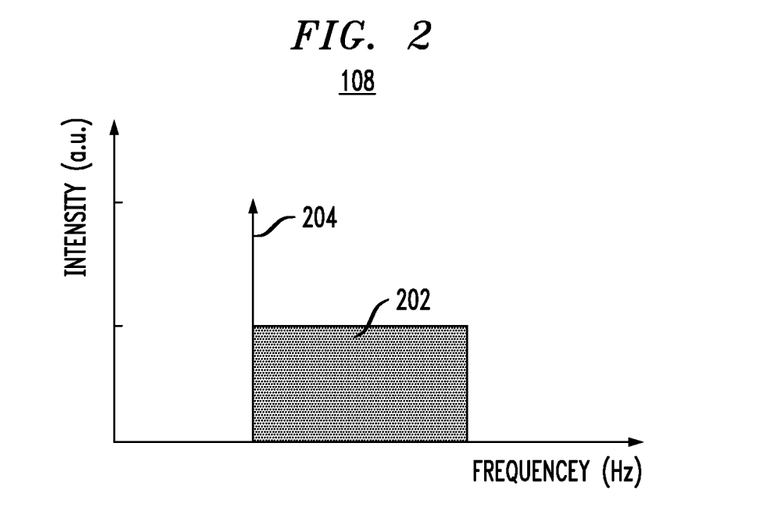
FIG. 2 graphically illustrates example spectral characteristics of an optical input signal processed by the optical receiver of FIG. 1 according to an embodiment.

FIG. 2 graphically illustrates example spectral characteristics of optical input signal 108 according to an embodiment. As indicated in FIG. 2, optical input signal 108 carries (i) a data-modulated signal represented by a rectangle 202 and (ii) a CW component represented by an arrow 204. CW component 204 is spectrally narrow (e.g., a spectral line) and has a carrier frequency that is approximately spectrally aligned with a roll-off edge of the data-modulated signal 202.

In some embodiments, CW component 204 can be added to data-modulated signal 202 at the corresponding remote transmitter (not explicitly shown in FIG. 1). In such embodiments, receiver 100 does not need and may not have optical signal combiner 106. In such embodiments, an optical signal 102 received by receiver 100 from the remote transmitter already typically has the spectral characteristics indicated in FIG. 2.

In some other embodiments, the optical signal 102 received by receiver 100 from the remote transmitter may only carry the data-modulated signal 202. In such embodiments, optical signal combiner 106 is used to add the CW component 204 to the data-modulated signal 202, thereby generating the optical input signal 108 having the spectral characteristics indicated in FIG. 2. In such embodiments, a local-oscillator signal 104 carrying the CW component 204 can be generated at receiver 100 using a suitable laser source (also see FIG. 9).

Due to the presence of both data-modulated signal 202 and CW component 204, the digital electrical signal generated by ADC 120 in response to the electrical signal applied thereto by photodiode 110 enables DSP 130 to reconstruct the electric field (e.g., accurately estimate both the amplitude and phase) of data-modulated signal 202. Example embodiments of DSP 130 that can be used for this purpose are described in more detail below in reference to FIGS. 3-8. At least some of such embodiments can advantageously be used, e.g., to extend the maximum transmission distance over which optical signal 102 can be transported to receiver 100 and decoded thereat with an acceptable bit-error rate (BER).

In some embodiments, optical signal 102 may correspond to a channel of a wavelength-division-multiplexed (WDM) signal, e.g., as described in the above-cited U.S. patent application Ser. No. 15/581,578.

Figure 3:
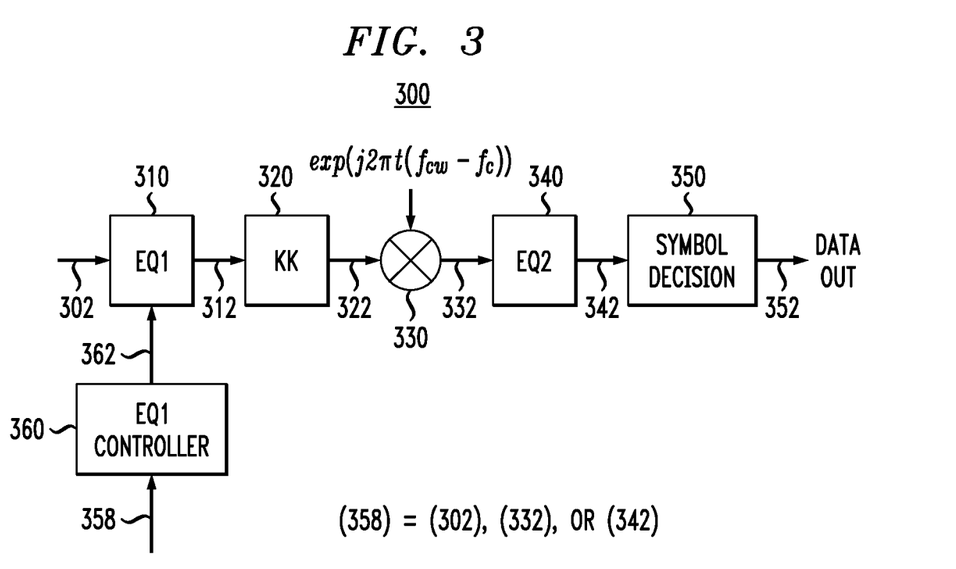
FIG. 3 shows a block diagram of a digital circuit that can be used in the optical receiver of FIG. 1 according to an embodiment.

FIG. 3 shows a block diagram of a digital circuit 300 that can be used in DSP 130 (FIG. 1) according to an embodiment. A person of ordinary skill in the art will understand that DSP 130 may include additional digital circuits appropriately connected to circuit 300, e.g., as known in the pertinent art.

In an example embodiment, circuit 300 comprises digital filters 310 and 340 (denoted EQ1 and EQ2, respectively) located upstream and downstream, respectively, from a Kramers-Kronig (KK) field-reconstruction module 320 in the chain of signal processing. Circuit 300 further comprises an electronic controller 360 that can be used to control the configuration of at least digital filter 310. For example, controller 360 can be configured to set and, if necessary, change the configuration of digital filter 310 by way of a control signal 362, which can be generated by the controller in response to an input signal 358. Several example embodiments of controller 360 are described in more detail below in reference to FIGS. 4-8. In some embodiments, controller 360 can additionally be configured to control the configuration of digital filter 340.

The operation of digital filters 310 and 340 can be conceptually understood by approximating the overall transfer function H of the data channel between the corresponding remote data source and DSP 130 using a product of the transfer functions $H_2$ and $H_1$ as follows:

$$H = H_2 \times H_1 \tag{1}$$

where $H_2$ is the transfer function of the optical transmitter and optical transport link; and $H_1$ is the transfer function of the analog front end of receiver 100. For example, the transfer function $H_2$ may represent (i) signal distortions caused by the analog front end of the remote transmitter and (ii) one or more transport-link impairments, such as chromatic dispersion in the optical fiber, etc. The transfer function $H_1$ may represent signal distortions caused by the analog front end of receiver 100, e.g., including signal distortions caused by photodiode 110 and the corresponding transimpedance amplifier (not explicitly shown in FIG. 1) and by ADC 120. Digital filter 310 is configured to apply a transfer function that approximates $(H_1)^{-1}$, i.e., the inverse of the transfer function $H_1$. Digital filter 340 is configured to apply a transfer function that approximates $(H_2)^{-1}$, i.e., the inverse of the transfer function $H_2$.

In an example embodiment, a digital input signal 302 applied to circuit 300 represents the intensity I(t) of the optical input signal 108, with the distortions corresponding to the transfer function $H_1$ being imposed thereon. A digital output signal 312 generated by digital filter 310 represents the intensity I(t) in a manner that causes a significant portion of those distortions to be removed. As such, digital signal 312 can be approximately expressed as follows:

$$I(t) = |E(t)|^2 \tag{2}$$

where t is time; and E(t) is the effective electric field of optical input signal 108 that can be expressed using Eq. (3):

$$E(t) = E_1(t) + E_0 \exp(j\pi Bt) \tag{3}$$

where $E_1$ and B represent the effective electric field and bandwidth, respectively, of the data-modulated signal 202; and $E_0$ represents the effective electric field of the CW component 204 (also see FIG. 2).

The KK field-reconstruction module 320 applies a suitable field-reconstruction algorithm to digital signal 312 to generate a corresponding digital signal 322 that represents the effective electric field $E_1$. In an example embodiment, the KK field-reconstruction module 320 can compute the effective electric field $E_1$ in accordance with Eqs. (4)-(5) as follows:

$$E_1(t) = (\sqrt{I(t)}\, \exp[j\phi_E(t)] - E_0)\exp(j\pi Bt) \tag{4}$$

where the phase $\phi_E(t)$ is expressed using Eq. (5):

$$\phi_E(t) = \frac{1}{2\pi} p.v. \int_{-\infty}^{\infty} dt' \frac{\log[I(t')]}{t - t'} \tag{5}$$

where the function "p.v." returns the principal value of the shown integral. Some embodiments of the KK field-reconstruction module 320 may benefit from the use of certain features of the KK field-reconstruction algorithm described in the above-cited paper by Mecozzi.

Circuit 300 further comprises a frequency-offset-correction (FOC) circuit 330 and a decoder 350 located upstream and downstream, respectively, from digital filter 340.

In an example embodiment, FOC circuit 330 operates on digital signal 322 to substantially stop the phase rotation caused by the frequency difference between the carrier frequency ($f_{CW}$) of the CW component 204 and the center frequency ($f_c$) of the data-modulated signal 202 (also see FIG. 2). In some embodiments, FOC circuit 330 can be implemented using a multiplier, e.g., as indicated in FIG. 3. A resulting digital output signal 332 generated by FOC circuit 330 is applied to digital filter 340.

In an example embodiment, digital filter 340 can be configured to apply blind equalization to digital signal 332, thereby converting it into a corresponding digital signal 342, wherein a significant portion of the distortions corresponding to the transfer function $H_2$ has been removed. The blind-equalization algorithm used to appropriately configure digital filter 340 for this purpose can be, e.g., a constant modulus algorithm (CMA), a multiple modulus algorithm (MMA), a least mean square algorithm (LMSA), etc. An example signal impairment that can be compensated by digital filter 340 is dispersion. A person of ordinary skill in the art will understand, without undue experimentation, how to use any of the aforementioned algorithms to appropriately configure digital filter 340 for electronic dispersion compensation.

In some embodiments, the filter coefficients of digital filter 340 can be set using a suitable electronic controller, e.g., controller 360.

Decoder 350 operates in a conventional manner to map digital signal 342 onto the operative constellation, thereby converting digital signal 342 into the corresponding binary data 352. In an example embodiment, the data 352 comprises a stream of binary labels of the constellation points onto which digital signal 342 has been mapped in different time slots.

It should be noted here that, in an example embodiment, digital signal 312 is real-valued, whereas digital signals 322, 332, and 342 are typically complex-valued.

In some embodiments, the data 352 can be subjected to further processing as known in the art. Such further processing may include, e.g., forward error correction (FEC) if FEC encoding is applied at the corresponding remote transmitter.

Figure 4:
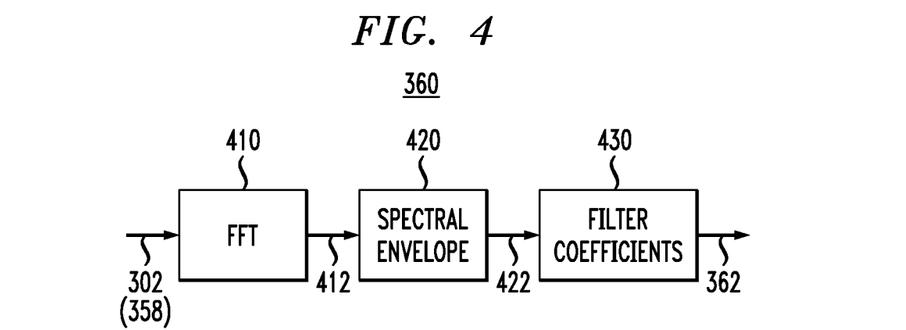
FIG. 4 shows a block diagram of an electronic controller that can be used in the digital circuit of FIG. 3 according to an embodiment.

FIG. 4 shows a block diagram of controller 360 (FIG. 3) according to an embodiment. In this embodiment, the input signal 358 applied to controller 360 is a copy of digital signal 302 (also see FIG. 3).

The embodiment of FIG. 4 may be useful when the overall transfer function H is dominated by the magnitude of the transfer function $H_1$. This particular situation can occur, e.g., when the transmitter roll-off is digitally pre-compensated thereat and the optical-transport link does not impose any significant distortion on the optical signal 102 received by optical receiver 100 (also see FIG. 1).

In the embodiment of FIG. 4, controller 360 comprises a fast-Fourier-transform (FFT) module 410 configured to receive a copy of digital signal 302 as an input. In operation, FFT module 410 applies a Fourier transform to a sequence of digital samples supplied by digital signal 302, thereby generating a corresponding set of spectral samples 412. FFT module 410 then transfers spectral samples 412 to a spectral-envelope-evaluation (SEE) module 420.

SEE module 420 uses spectral samples 412 to determine the corresponding spectral envelope $S_1(f)$. Such a determination may include, e.g., fitting and/or interpolating/extrapolating the discrete spectrum defined by the received spectral samples 412. SEE module 420 can then compute a spectral correction function C(f) by comparing the spectral envelope $S_1(f)$ with an expected (or desired) spectral envelope $S_0(f)$. For example, in some embodiments, the portion of the spectral envelope $S_0(f)$ corresponding to the data-modulated signal 202 can be represented by a rectangular step function having a constant non-zero amplitude within a specified frequency range and a zero amplitude outside that frequency range. In other embodiments, other appropriate functions for the spectral envelope $S_0(f)$ can alternatively be used. In an example embodiment, SEE module 420 can be configured to compute the spectral correction function C(f) in accordance with Eq. (6):

$$C(f) = S_0(f)/S_1(f) \quad (6)$$

The spectral correction function C(f) computed by SEE module 420 is communicated, by way of a digital signal 422, to a filter-coefficients module 430.

Filter-coefficients module 430 uses the spectral correction function C(f) specified by digital signal 422 to compute the corresponding filter coefficients for digital filter 310 and apply the computed filter coefficients to that digital filter by way of control signal 362. Depending on the specific implementation of digital filter 310, the filter coefficients can be frequency-domain filter coefficients or time-domain filter coefficients. A person of ordinary skill in the art will understand that these two sets of filter coefficients can be inter-converted by way of an appropriate discrete Fourier transform as known in the pertinent art. In some embodiments, filter-coefficients module 430 can be compatible with an implementation of digital filter 310 that employs one or more finite-impulse-response (FIR) filters.

Figure 5:
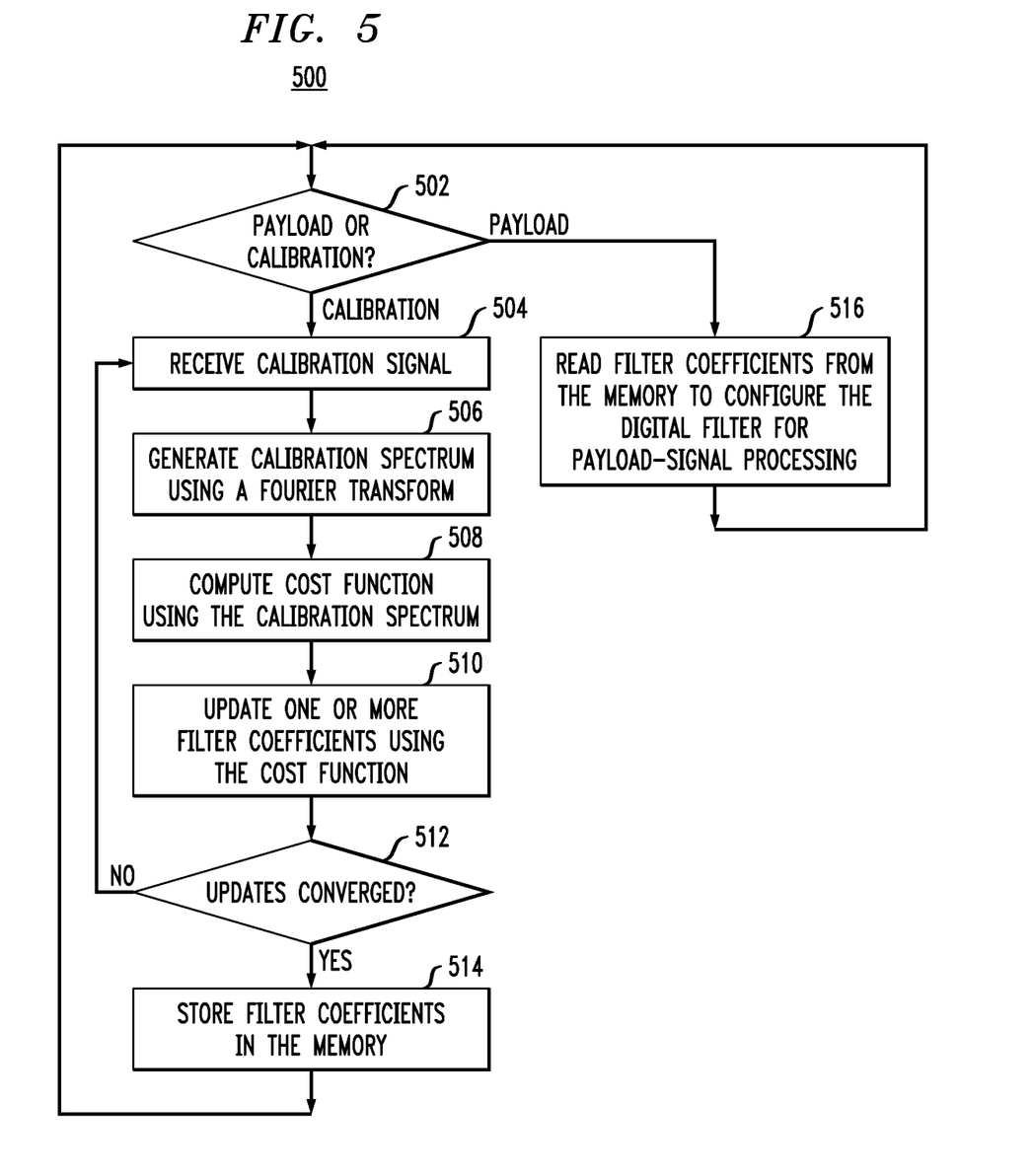
FIG. 5 shows a flow chart of a control method that can be used in the digital circuit of FIG. 3 according to an embodiment.

FIG. 5 shows a flow chart of a control method 500 that can be used in controller 360 (FIG. 3) according to an alternative embodiment. In this particular embodiment, the input signal 358 applied to controller 360 is a copy of digital signal 332 (also see FIG. 3) generated in a calibration mode of receiver 100.

Step 502 of method 500 is used to switch controller 360 between two different modes of operation. In the calibration mode, step 502 directs the processing of method 500 to steps 504-514, using which the filter coefficients for digital filter 310 can be determined. In the payload mode, step 502 directs the processing of method 500 to step 516, wherein the filter coefficients determined during the prior instance of the calibration mode are used to configure digital filter 310 for processing the payload signal.

At step 504, optical receiver 100 receives a calibration signal 108.

Figure 6:
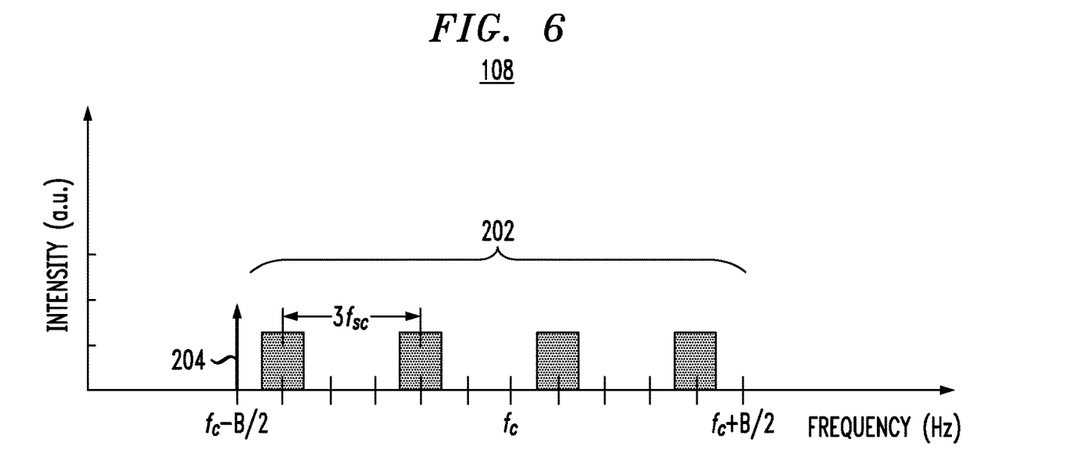
FIG. 6 graphically illustrates example spectral characteristics of a calibration signal that can be used in the control method of FIG. 5 according to an embodiment.

FIG. 6 graphically illustrates example spectral characteristics of a calibration signal 108 that can be used at step 504 according to an embodiment. Similar to the payload signal 108 described above in reference to FIG. 2, calibration signal 108 of FIG. 6 has a CW component 204 and a data-modulated signal 202. However, the relative optical power of the CW component 204 and data-modulated signal 202 may be different from that used in the payload mode to ensure convergence of the calibration algorithm implemented using steps 506-514.

In an example embodiment, the data-modulated signal 202 used during the calibration mode can be generated using a suitable subcarrier-multiplexing scheme, according to which the bandwidth B of signal 202 is divided into N frequency bins, each having the spectral width $f_{sc}$. Herein, N is a positive integer, e.g., selected within the range of four to one thousand. Each third bin of the shown data-modulated signal 202 is loaded with a corresponding subcarrier modulated using a suitable modulation format, such as QPSK or QAM. The remaining frequency bins within the bandwidth B of the shown data-modulated signal 202 remain unloaded (i.e., have a zero subcarrier amplitude). In some embodiments, the different subcarriers can be mutually orthogonal, e.g., in accordance with a suitably selected orthogonal-frequency-division-multiplexing (OFDM) scheme.

At step 506 of method 500, controller 360 applies a Fourier transform to digital signal 332 corresponding to the calibration signal 108 of FIG. 6, thereby generating a corresponding calibration spectrum.

Figure 7:
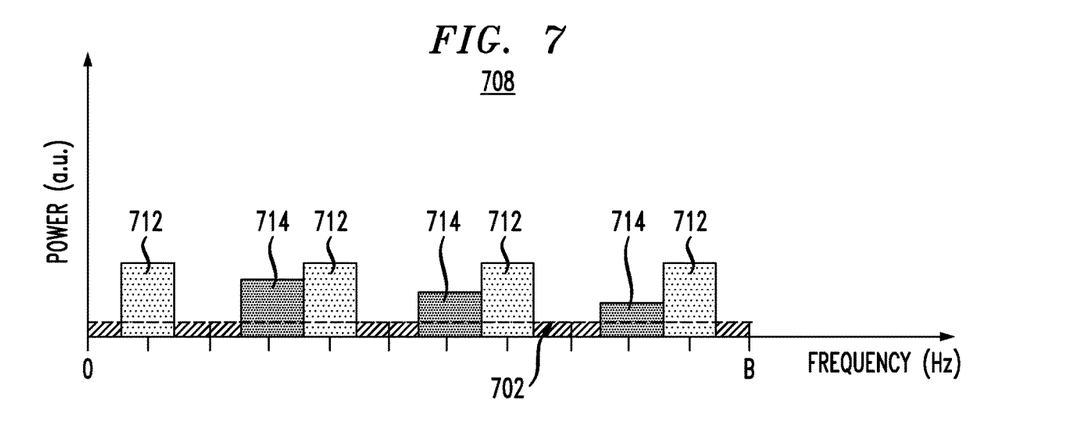
FIG. 7 graphically illustrates a calibration spectrum that can be generated during execution of the control method of FIG. 5 according to an embodiment.

FIG. 7 graphically illustrates an example calibration spectrum 708 that can be generated at step 506 according to an embodiment. As indicated in FIG. 7, spectrum 708 has more frequency bins that contain signals with the amplitudes above the noise floor 702 than the number of loaded frequency bins in the calibration signal 108 of FIG. 6. More specifically, some of the signal-containing frequency bins (labeled 712) in spectrum 708 correspond to the loaded frequency bins in the calibration signal 108 of FIG. 6. However, there are additional signal-containing frequency bins (labeled 714) in spectrum 708 that correspond to the unloaded frequency bins in the calibration signal 108 of FIG. 6. The signals in the frequency bins 714 represent the signal-to-signal beat interference (SSBI) caused by the direct (square-law) detection performed in the analog front end of receiver 100.

In some alternative embodiments, steps 504 and 506 can be implemented using a different suitable calibration signal 108. For example, in one alternative embodiment, the calibration signal 108 of FIG. 6 can be modified such that each second (rather than each third) frequency bin of the data-modulated signal 202 is loaded with a corresponding modulated subcarrier while the remaining frequency bins within the bandwidth B remain unloaded. A person of ordinary skill in the art will understand that the use of this modified calibration signal 108 will result in a calibration spectrum that is different from spectrum 708 (FIG. 7). However, this resulting calibration spectrum also provides a usable measure of the SSBI that can be extracted from the spectrum in a relatively straightforward manner. Additional description of the manner in which an example alternative calibration signal 108 can be generated is provided, e.g., in Wei-Ren Peng, Xiaoxia Wu, Vahid Arbab, Bishara Shamee, et al., "Experimental Demonstration of a Coherently Modulated and Directly Detected Optical OFDM System Using an RF-Tone Insertion," Optical Fiber Communication Conference/National Fiber Optic Engineers Conference OSA Technical Digest (Optical Society of America, 2008), paper OMU2, which is incorporated herein by reference in its entirety.

At step 508 of method 500, controller 360 uses the calibration spectrum (e.g., 708, FIG. 7) generated at step 506 to compute a cost function Q(h), where h denotes the vector of filter coefficients presently used in digital filter 310. In an example embodiment, the cost function Q(h) can be calculated in accordance with Eq. (7):

$$Q(h) = P_{SSBI}/P_{sig} \quad (7)$$

where $P_{SSBI}$ is the integrated power of the SSBI; and $P_{sig}$ is the integrated power of the useful signal, wherein the integration is performed over the bandwidth B.

For example, using the calibration spectrum 708 of FIG. 7, $P_{SSBI}$ can be calculated as a sum of the signal amplitudes in the frequency bins 714. $P_{sig}$ can similarly be calculated as a sum of the signal amplitudes in the frequency bins 712.

A person of ordinary skill in the art will understand that a cost function Q(h) that differs from that expressed by Eq. (7) can also be used, as long as that cost function enables adjustment of the filter coefficients of digital filter 310 directed at reducing (e.g., minimizing) the SSBI.

At step 510 of method 500, controller 360 runs an optimization algorithm using the cost function computed at step 508, with the optimization being directed at finding the vector h of the filter coefficients that can keep the SSBI at an acceptably low level, e.g., with the SSBI power $P_{SSBI}$ being lower than a fixed threshold.

In an example embodiment, the optimization algorithm can be implemented using an iterative process performed in accordance with Eq. (8):

$$h'_n = h_n - \mu \frac{\partial Q(h)}{\partial h_n} \quad (8)$$

where the index n (=1, 2, . . . , N) denotes the n-th tap of digital filter 310; $h_n'$ is the updated filter coefficient used at the n-th tap; $h_n$ is the present filter coefficient used at the n-th tap; and p is the fixed weight with which the filter coefficients are updated after each iteration. The different filter taps are considered to be independent of one another. In other words, to update the n-th tap, a small change of the coefficient $h_n$ can be made while the other tap coefficients remain unchanged. The resulting change of the cost function Q(h) is then determined and used to compute the updated filter coefficient $h_n'$ using Eq. (8). Several rounds of such updates may occur before the algorithm converges on an acceptable solution for the vector h.

At step 512 of method 500, controller 360 determines whether or not the optimization algorithm has converged onto an acceptable solution for the vector h using any suitable convergence criterion. If the convergence criterion is satisfied, then the processing of method 500 is directed to step 514. Otherwise, the processing of method 500 is directed back to step 504 for further adjustment of the vector h.

At step 514 of method 500, controller 360 stores in the memory the found vector h of the filter coefficients, and the processing of method 500 is directed back to step 502.

At step 516 of method 500, controller 360 reads the vector h of the filter coefficients from the memory and generates control signal 362 that configures digital filter 310 to use those filter coefficients in the payload mode for the equalization of signals carrying payload data.

Some embodiments of method 500 may benefit from the use some additional features disclosed in Xi Chen, Sethumadhavan Chandrasekhar, and Peter Winzer, "Frequency-Resolved Measurements of Signal, Noise, and Signal-Signal Beat Interference in Self-Coherent Direct-Detection Receivers," published in Optical Fiber Communication Conference, OSA Technical Digest (Optical Society of America, 2018), paper W4E.6, which is incorporated herein by reference in its entirety.

Figure 8:
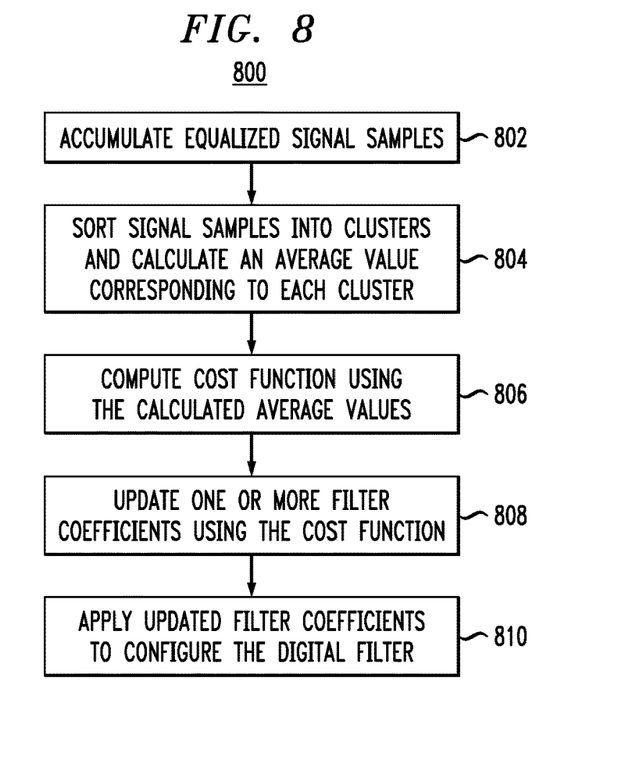
FIG. 8 shows a flow chart of a control method that can be used in the digital circuit of FIG. 3 according to another embodiment.

FIG. 8 shows a flow chart of a control method 800 that can be used in controller 360 (FIG. 3) according to another alternative embodiment. In this particular embodiment, the input signal 358 applied to controller 360 is a copy of digital signal 342 (also see FIG. 3). Method 800 can be executed during either a calibration mode or a payload mode of receiver 100. Method 800 may be useful, e.g., under channel conditions in which method 500 is not providing acceptable results, or for single-carrier signals where a suitable calibration spectrum (e.g., having the SSBI products spectrally separated from the loaded frequency bins) is not available.

At step 802, controller 360 operates to accumulate the values of digital signal 342 corresponding to M time slots, where M is a relatively large integer. A suitable value of M depends on the used constellation and is generally selected such that the accumulated values provide sufficient sampling of each of the constellation points. For example, if a 16-QAM constellation is being used, then the value of M may need to be in the range between one hundred and one thousand.

A person of ordinary skill in the art will understand that the digital complex values accumulated at step 802 typically form clusters on a complex plane, with each of such clusters having a center of gravity located near the corresponding "ideal" constellation point of the used constellation. Within the cluster, the scatter of the values of digital signal 342 is typically caused by noise. The deviation of the center of gravity of each cluster from the corresponding "ideal" constellation point can be attributed, at least in part, to the effects of transfer function $H_1$.

At step 804, controller 360 operates to calculate the average complex value for each of the above-described clusters, e.g., by summing the corresponding accumulated complex values and then dividing the resulting sum by the number of summed values.

At step 806, controller 360 uses the average complex values generated at step 804 to compute a cost function Q(h), where h denotes the vector of filter coefficients presently used in digital filter 310. In an example embodiment, the cost function Q(h) can be calculated in accordance with Eq. (9):

$$Q(h) = \sum_k |\bar{z}_k - z_k|^2 \qquad (9)$$

where $\bar{z}_k$ is the average complex value corresponding to the k-th constellation point; $z_k$ is the complex value representing the "ideal" k-th constellation point; and the summation is performed over the entire constellation. A person of ordinary skill in the art will understand that the cost function of Eq. (9) represents a "squared distance" between the used ("ideal") constellation and the effective average constellation that is being received by receiver 100.

At step 808, controller 360 runs an optimization algorithm using the cost function computed at step 806, with the optimization being directed at finding the vector h of filter coefficients that causes the above-mentioned "squared distance" to be sufficiently small, e.g., smaller than a fixed threshold. In an example embodiment, the optimization algorithm can be implemented using an iterative process performed in accordance with Eq. (8) and in a manner similar to that described above in reference to steps 510 and 512 of method 500 (also see FIG. 5).

At step 810, controller 360 uses the vector h of the ("optimal") filter coefficients determined at step 808 to generate control signal 362 that configures digital filter 310 to use those filter coefficients instead of the previously used filter coefficients.

In some embodiments, method 800 can be run continuously in the background, without significantly disturbing the data-recovery pipeline. In some other embodiments, method 800 can be run from time to time, e.g., as needed to maintain an acceptable filter configuration.

Figure 9:
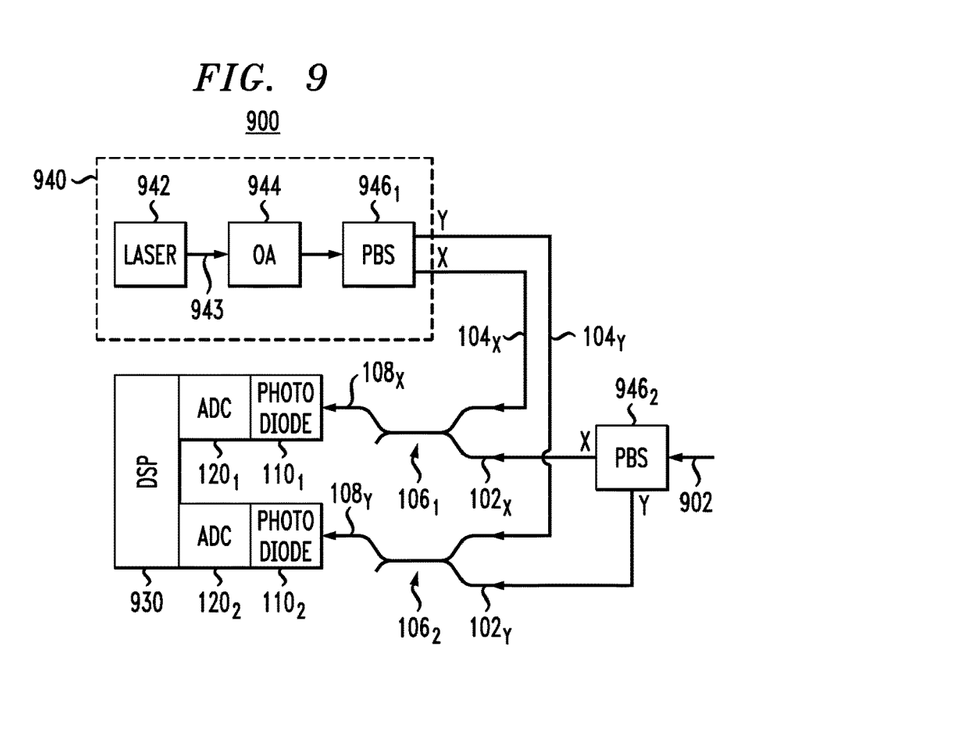
FIG. 9 shows a block diagram of an optical receiver according to another embodiment.

FIG. 9 shows a block diagram of an optical receiver 900 according to another embodiment. Receiver 900 uses many of the same elements as receiver 100 (FIG. 1), which elements are labeled in FIG. 9 using the same reference numerals as in FIG. 1. Different instances (e.g., nominal copies) of the same element are indicated in FIG. 9 by different subscripts.

Receiver 900 differs from receiver 100 (FIG. 1) in that receiver 900 is compatible with polarization division multiplexing (PDM).

In an example embodiment, receiver 900 comprises a light source 940 that includes: (i) a laser 942; (ii) an optional optical amplifier 944; and (iii) a polarization beam splitter (PBS) 946$_1$. Laser 942 operates to generate a light beam 943 having the carrier frequency corresponding to the CW component 204 (see FIG. 2). Optical amplifier 944 is configured to boost the optical power of light beam 943 such that PBS 946$_1$ can transfer sufficient carrier-frequency power to its optical outputs corresponding to the X- and Y-polarizations, respectively. The light beam 943 typically has both X- and Y-polarization components to enable PBS 946$_1$ to generate X- and Y-polarized beams 104$_X$ and 104$_Y$ that can be used to appropriately support the dual-polarization functionality of receiver 900.

Receiver 900 further comprises a PBS 946$_2$, optical couplers 106$_1$ and 106$_2$, photodiodes 110$_1$ and 110$_2$, ADCs 120$_1$ and 120$_2$, and a DSP 930. PBS 946$_2$ operates to split an optical input signal 902 into X- and Y-polarized components thereof, with the X-polarized component 102$_X$ being directed to optical coupler 120$_1$, and the Y-polarized component 102$_Y$ being directed to optical coupler 120$_2$. Optical coupler 120$_1$ operates to mix the X-polarized component 102$_X$ with the X-polarized beam 104$_X$ received from PBS 946$_1$, thereby generating the optical signal 108$_X$. Optical coupler 120$_2$ similarly operates to mix the Y-polarized component 102$_Y$ with the Y-polarized beam 104$_Y$ received from PBS 946$_1$, thereby generating the optical signal 108$_Y$.

In some embodiments, PBS 946$_1$ can be replaced by a power splitter, provided that optical couplers 106$_1$ and 106$_2$ are properly connected thereto to ensure the above-indicated respective polarizations of beams 104$_X$ and 104$_Y$ at the optical couplers.

Photodiode 110$_1$ operates to detect the optical signal 108$_X$, and ADC 120$_1$ then appropriately samples the resulting electrical signal. Photodiode 110$_2$ similarly operates to detect the optical signal 108$_Y$, and ADC 120$_2$ then appropriately samples the resulting electrical signal. DSP 930 operates to process both digital signals generated in this manner, e.g., as described in reference to FIG. 10.

Figure 10:
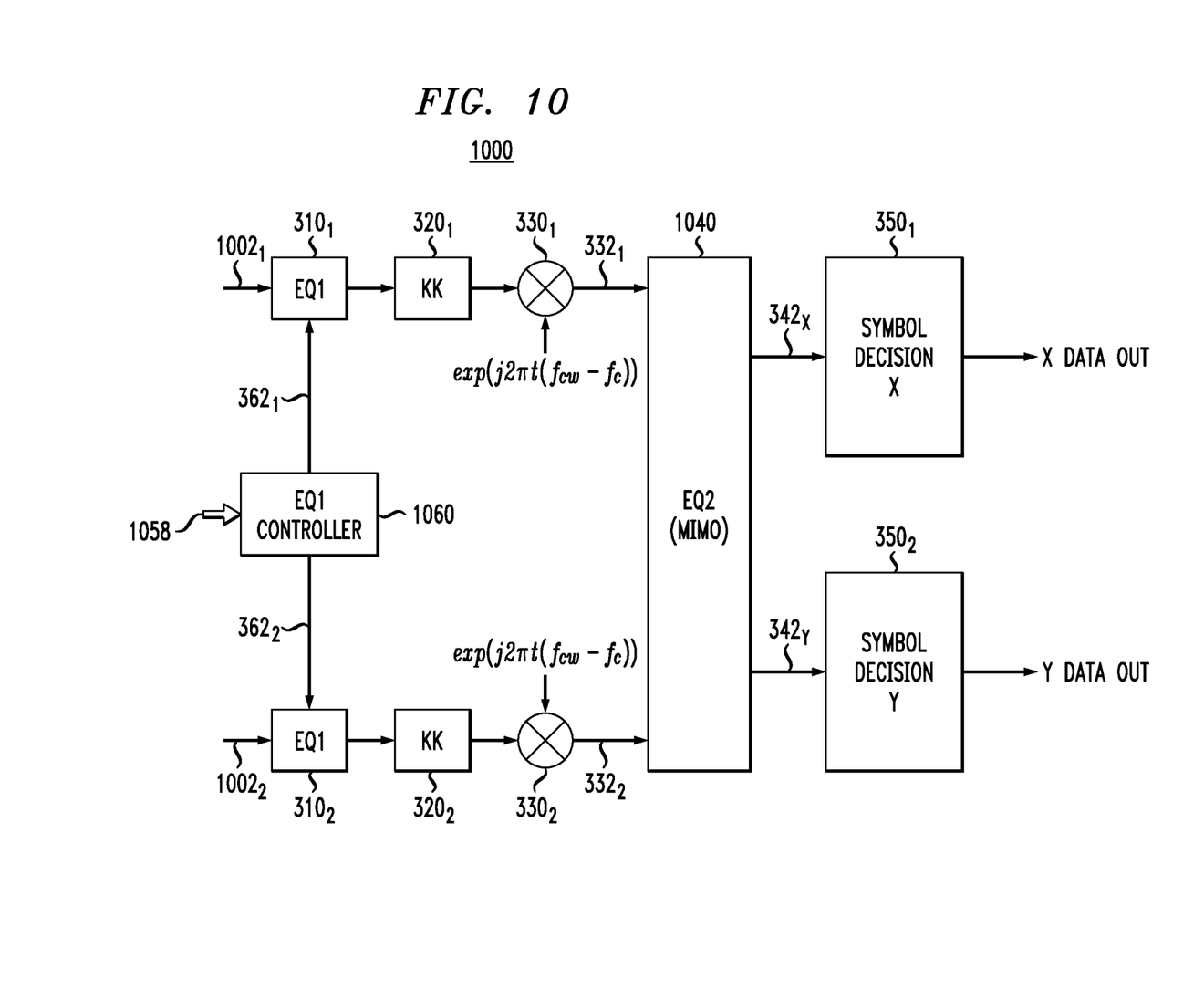
FIG. 10 shows a block diagram of a digital circuit that can be used in the optical receiver of FIG. 9 according to an embodiment.

FIG. 10 shows a block diagram of a digital circuit 1000 that can be used in DSP 930 (FIG. 9) according to an embodiment. Circuit 1000 uses many of the same elements as circuit 300 (FIG. 3), which elements are labeled in FIG. 10 using the same reference numerals. Different instances (e.g., nominal copies) of the same element are indicated in FIG. 10 by different subscripts. However, circuit 1000 differs from circuit 300 in that circuit 1000 is compatible with PDM. A person of ordinary skill in the art will understand that DSP 930 may include additional digital circuits appropriately connected to circuit 1000, e.g., as known in the pertinent art. The following description of circuit 1000 mainly focuses on differences between circuits 1000 and 300.

In an example embodiment, digital input signals $1002_1$ and $1002_2$ applied to circuit 1000 correspond to optical signals $108_X$ and $108_Y$, respectively.

An electronic controller 1060 is used to control the configurations of digital filters $310_1$ and $310_2$. For example, controller 1060 can set and, if necessary, change the configuration of digital filter $310_1$ by way of a control signal $362_1$. Controller 1060 can similarly set and, if necessary, change the configuration of digital filter $310_2$ by way of a control signal $362_2$.

Controller 1060 is configured to generate control signals $362_1$ and $362_2$ in response to one or more input signals 1058.

In one example embodiment, the input signals 1058 may include copies of the digital signals $1002_1$ and $1002_2$. In such an embodiment, controller 1060 may incorporate two instances (nominal copies) of the digital circuit shown in FIG. 4 and can be configured to generate each of the control signals $362_1$ and $362_2$ as described above in reference to FIG. 4.

In another example embodiment, the input signals 1058 may include copies of digital signals $332_1$ and $332_2$. In such an embodiment, controller 1060 can be configured to generate each of the control signals $362_1$ and $362_2$ using method 500 (FIG. 5).

In yet another example embodiment, the input signals 1058 may include copies of digital signals $342_X$ and $342_Y$. In such an embodiment, controller 1060 can be configured to generate each of the control signals $362_1$ and $362_2$ using method 800 (FIG. 8).

Circuit 1000 further comprises a 2×2 MIMO equalizer (EQ2) 1040, where "MIMO" stands for multiple-input/multiple-output. In an example embodiment, equalizer 1040 can be configured to perform MIMO-equalization processing of digital signals $332_1$ and $332_2$, e.g., as known in the art of digital coherent detection, thereby generating digital signals $342_X$ and $342_Y$. Such MIMO-equalization processing may include, but is not limited to electronic polarization demultiplexing and electronic dispersion compensation.

In an example embodiment, equalizer 1040 can be implemented using four FIR filters connected in a butterfly configuration.

According to an example embodiment disclosed above, e.g., in the summary section and/or in reference to any one or any combination of some or all of FIGS. 1-10, provided is an apparatus (e.g., 100, FIG. 1; 900, FIG. 9), comprising an analog front end (e.g., 110/120, FIG. 1) and a digital signal processor (e.g., 130, FIG. 1); wherein the analog front end comprises a photodetector (e.g., 110, FIG. 1) configured to convert an optical input signal (e.g., 108, FIG. 1) into an electrical signal proportional to an optical power of the optical input signal; and wherein the digital signal processor comprises a first digital filter (e.g., 310, FIG. 3) and a field-reconstruction circuit (e.g., 320, FIG. 3), the first digital filter being configured to generate a first filtered digital signal (e.g., 312, FIG. 3) in response to the electrical signal, the field-reconstruction circuit being configured to estimate (e.g., in accordance with Eqs. (4)-(5)) an amplitude and a phase of the optical input signal in response to the first filtered digital signal; and wherein the first digital filter is configurable (e.g., via 362, FIG. 3) to digitally filter a digital representation (e.g., 302, FIG. 3) of the electrical signal to remove therefrom at least some signal distortions imposed by the analog front end.

In some embodiments of the above apparatus, the field-reconstruction circuit is configured to use a Kramers-Kronig algorithm (e.g., in accordance with Eqs. (4)-(5)).

In some embodiments of any of the above apparatus, the digital signal processor further comprises an electronic controller (e.g., 360, FIG. 3) connected to configure the first digital filter in response to a digital input signal (e.g., 358, FIG. 3).

In some embodiments of any of the above apparatus, the digital signal processor is configured to generate the digital input signal using a feed-forward path toward the first digital filter (e.g., as shown in FIG. 4).

In some embodiments of any of the above apparatus, the digital signal processor is configured to generate the digital input signal using a feedback path toward the first digital filter (e.g., as described in reference to FIG. 8).

In some embodiments of any of the above apparatus, the digital input signal is the digital representation of the electrical signal (e.g., (358)=(302), FIG. 3).

In some embodiments of any of the above apparatus, the digital input signal (e.g., (358)=(332) or (342), FIG. 3) is applied to the electronic controller by a digital circuit driven by an output of the field-reconstruction circuit.

In some embodiments of any of the above apparatus, the electronic controller comprises a Fourier-transform circuit (e.g., 410, FIG. 4; 506, FIG. 5).

In some embodiments of any of the above apparatus, the electronic controller is configured to determine filter coefficients for the first digital filter using an optical calibration signal (e.g., 108, FIG. 6).

In some embodiments of any of the above apparatus, the optical calibration signal comprises an optical OFDM signal having in which loaded OFDM subcarriers are spectrally separated by one or more unloaded OFDM subcarriers (e.g., as in FIG. 6).

In some embodiments of any of the above apparatus, the electronic controller is configured to cause the first digital filter to use filter coefficients that reduce effects of signal-to-signal beat interference.

In some embodiments of any of the above apparatus, the digital signal processor further comprises a second digital filter (e.g., 340, FIG. 3; 1040, FIG. 10) configured to generate a second filtered digital signal (e.g., 342, FIGS. 3, 10) in response to a digital output signal generated by the field-reconstruction circuit.

In some embodiments of any of the above apparatus, the second digital filter is configured to perform electronic dispersion compensation.

In some embodiments of any of the above apparatus, the second digital filter (e.g., 1040, FIG. 10) is further configured to perform electronic polarization demultiplexing.

In some embodiments of any of the above apparatus, the second digital filter (e.g., 1040, FIG. 10) is configured to perform electronic polarization demultiplexing.

In some embodiments of any of the above apparatus, the digital signal processor further comprises a decoder (e.g., 350, FIGS. 3, 10) configured to recover data encoded in the optical input signal using the second filtered digital signal.

In some embodiments of any of the above apparatus, the digital signal processor further comprises an electronic controller (e.g., 360, FIG. 3) connected to configure the first digital filter in response to the second filtered digital signal (e.g., (358)=(342), FIG. 3).

In some embodiments of any of the above apparatus, the digital signal processor further comprises an electronic controller (e.g., 360, FIG. 3) connected to configure the first digital filter in response to the digital output signal generated by the field-reconstruction circuit (e.g., (358)=(332), FIG. 3).

In some embodiments of any of the above apparatus, the apparatus further comprises: a laser (e.g., 942, FIG. 9) configured to generate CW light (e.g., 104, FIGS. 1, 9); and an optical coupler (e.g., 106, FIGS. 1, 9) configured to generate the optical input signal by combining the CW light with a modulated optical signal (e.g., 102, FIGS. 1, 9).

In some embodiments of any of the above apparatus, the CW light has a carrier frequency that is spectrally aligned with a roll-off edge of the modulated optical signal (e.g., 204 vs. 202, FIG. 2).

In some embodiments of any of the above apparatus, the apparatus further comprises a polarization beam splitter (e.g., 946$_2$, FIG. 9) connected to apply the modulated optical signal to the optical coupler.

In some embodiments of any of the above apparatus, the first digital filter is configured to reduce effects of signal-to-signal beat interference.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

A person of ordinary skill in the art would readily recognize that steps of various above-described methods can be performed by programmed processors and/or computers. Herein, some embodiments are intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media, such as magnetic disks or tapes, hard drives, or optically readable digital data storage media. The embodiments are also intended to cover computers programmed to perform said steps of methods described herein.

The description and drawings merely illustrate the principles of the disclosure. All examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus, comprising an analog front end and a digital signal processor;
   wherein the analog front end comprises a photodetector configured to convert an optical input signal into an electrical signal proportional to an optical power of the optical input signal;
   wherein the digital signal processor comprises a first digital filter and a field-reconstruction circuit, the first digital filter being configured to generate a first filtered digital signal in response to the electrical signal, the field-reconstruction circuit being configured to estimate at least a phase of the optical input signal in response to the first filtered digital signal;
   wherein the first digital filter is configurable to digitally filter a digital representation of the electrical signal to remove therefrom at least some signal distortions imposed by the analog front end;
   wherein the field-reconstruction circuit is configured to use a Kramers-Kronig algorithm to estimate said at least a phase of the optical input signal based on the first filtered digital signal; and
   wherein the digital signal processor further comprises an electronic controller connected to configure the first digital filter in response to a digital input signal.

2. The apparatus of claim 1, wherein the field-reconstruction circuit is configured to use a Kramers-Kronig algorithm configured to estimate an amplitude and a phase of the optical input signal based on the first filtered digital signal.

3. The apparatus of claim 1, wherein the digital signal processor is configured to generate the digital input signal using a feed-forward path toward the first digital filter.

4. The apparatus of claim 1, wherein the digital signal processor is configured to generate the digital input signal using a feedback path toward the first digital filter.

5. The apparatus of claim 1, wherein the digital input signal is the digital representation of the electrical signal.

6. The apparatus of claim 1, wherein the digital input signal is applied to the electronic controller by a digital circuit driven by an output of the field-reconstruction circuit.

7. The apparatus of claim 1, wherein the electronic controller comprises a Fourier-transform circuit.

8. The apparatus of claim 1, wherein the electronic controller is configured to determine filter coefficients for the first digital filter using an optical calibration signal.

9. The apparatus of claim 8, wherein the optical calibration signal comprises an optical OFDM signal having in which loaded OFDM subcarriers are spectrally separated by one or more unloaded OFDM subcarriers.

10. The apparatus of claim 1, further comprising:
    a laser configured to generate CW light; and
    an optical coupler configured to generate the optical input signal by combining the CW light with a modulated optical signal.

11. The apparatus of claim 10, wherein the CW light has a carrier frequency that is spectrally aligned with a roll-off edge of the modulated optical signal.

12. The apparatus of claim 10, further comprising a polarization beam splitter connected to apply the modulated optical signal to the optical coupler.

13. The apparatus of claim 1, wherein the first digital filter is configured to reduce effects of signal-to-signal beat interference.

14. An apparatus, comprising an analog front end and a digital signal processor;
    wherein the analog front end comprises a photodetector configured to convert an optical input signal into an electrical signal proportional to an optical power of the optical input signal;
    wherein the digital signal processor comprises a first digital filter and a field-reconstruction circuit, the first digital filter being configured to generate a first filtered digital signal in response to the electrical signal, the field-reconstruction circuit being configured to estimate at least a phase of the optical input signal in response to the first filtered digital signal;
    wherein the first digital filter is configurable to digitally filter a digital representation of the electrical signal to remove therefrom at least some signal distortions imposed by the analog front end;
    wherein the field-reconstruction circuit is configured to use a Kramers-Kronig algorithm to estimate said at least a phase of the optical input signal based on the first filtered digital signal; and
    wherein the digital signal processor further comprises a second digital filter configured to generate a second filtered digital signal in response to a digital output signal generated by the field-reconstruction circuit.

15. The apparatus of claim 14, wherein the second digital filter is configured to perform at least one of electronic dispersion compensation and electronic polarization demultiplexing.

16. The apparatus of claim 14, wherein the second digital filter is configured to perform electronic polarization demultiplexing.

17. The apparatus of claim 14, wherein the digital signal processor further comprises a decoder configured to recover data encoded in the optical input signal using the second filtered digital signal.

18. The apparatus of claim 14, wherein the digital signal processor further comprises an electronic controller connected to configure the first digital filter in response to the second filtered digital signal.

19. The apparatus of claim 14, wherein the digital signal processor further comprises an electronic controller connected to configure the first digital filter in response to the digital output signal generated by the field-reconstruction circuit.

20. The apparatus of claim 14, wherein the first digital filter is configured based on a power of signal-to-signal beat interference.

21. The apparatus of claim 14, wherein the first digital filter is configured based on a difference between a received constellation and a used constellation.

22. The apparatus of claim 1, wherein the electronic controller is configured to determine filter coefficients for the first digital filter based on a power of signal-to-signal beat interference.

23. The apparatus of claim 1, wherein the electronic controller is configured to determine filter coefficients for the first digital filter based on a difference between a received constellation and a used constellation.

* * * * *